Aug. 25, 1953

J. M. HAIT 2,649,730

METHOD OF AND APPARATUS FOR EXTRACTING
JUICE FROM WHOLE CITRUS FRUIT

Filed Feb. 16, 1949

J. M. HAIT
INVENTOR.

BY

ATTORNEY

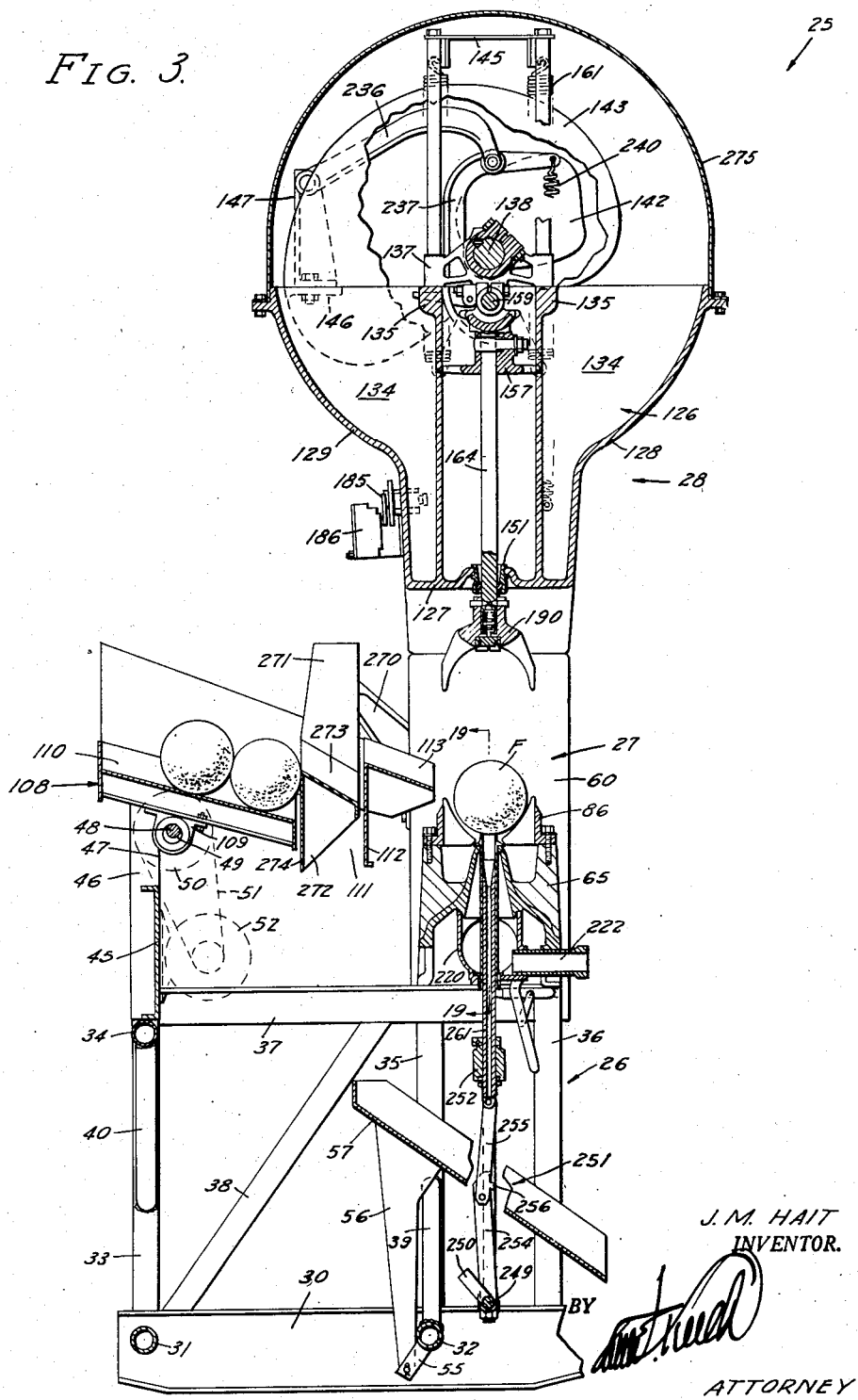

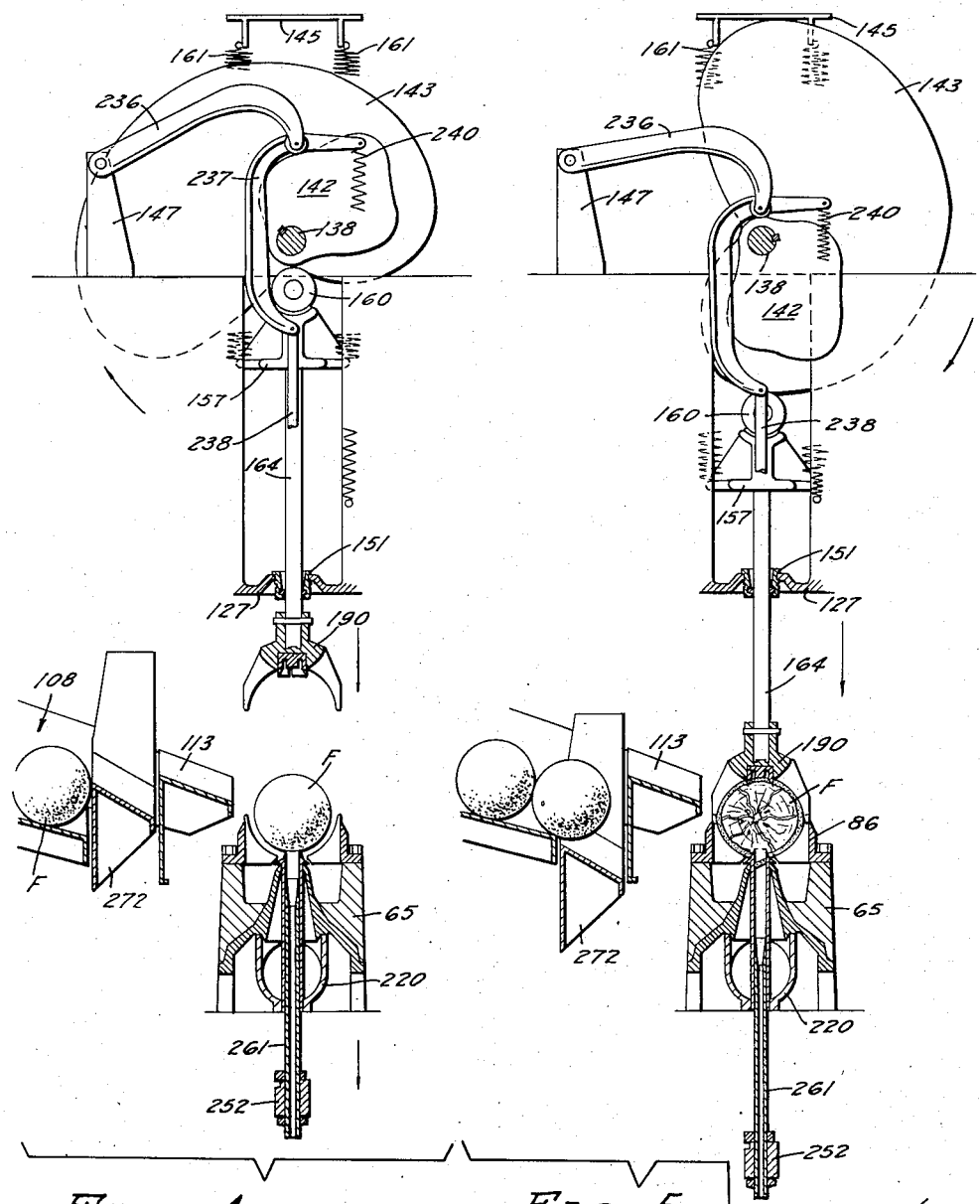

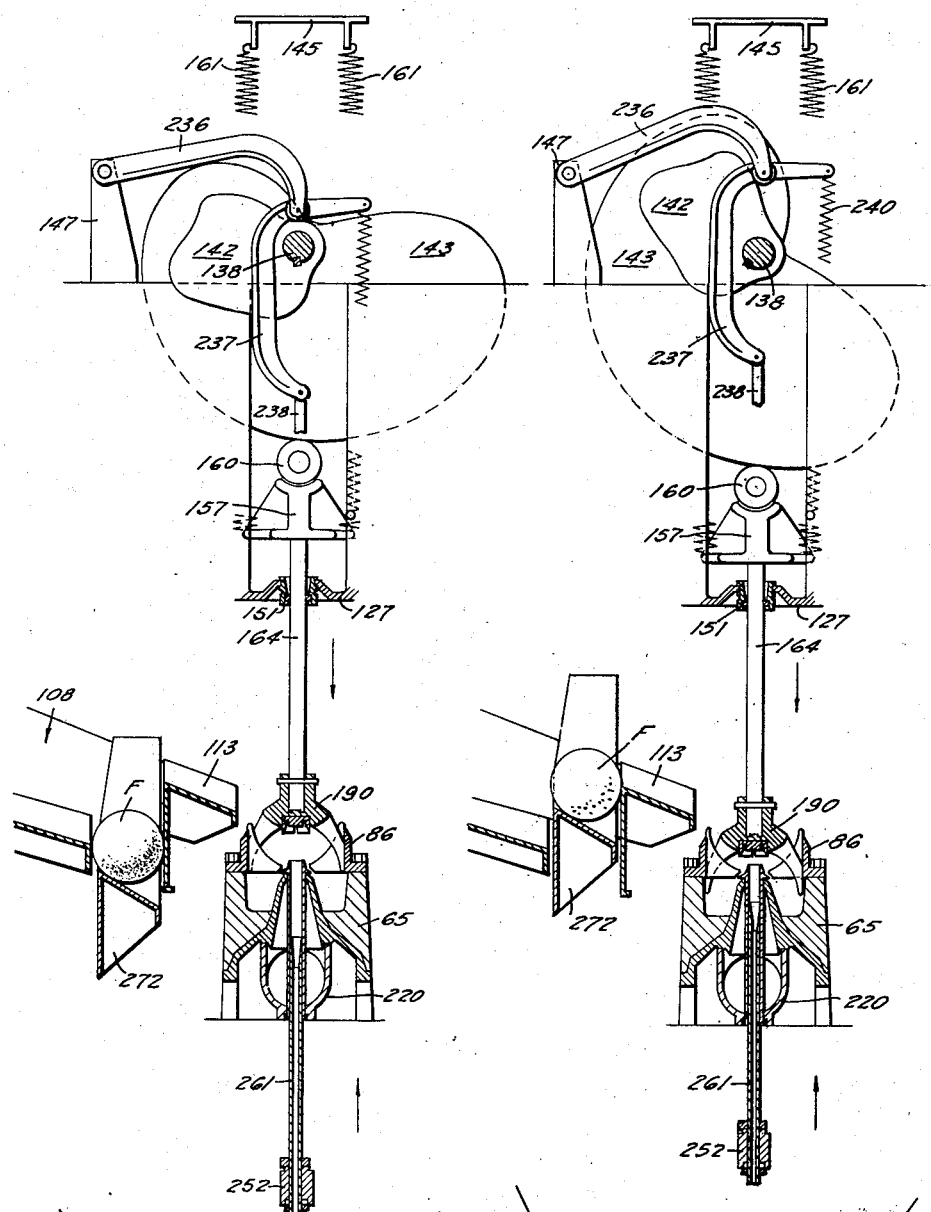
Aug. 25, 1953   J. M. HAIT   2,649,730
METHOD OF AND APPARATUS FOR EXTRACTING
JUICE FROM WHOLE CITRUS FRUIT
Filed Feb. 16, 1949   11 Sheets-Sheet 5
FIG. 6.
FIG. 7.
J. M. HAIT
INVENTOR.
BY 
ATTORNEY

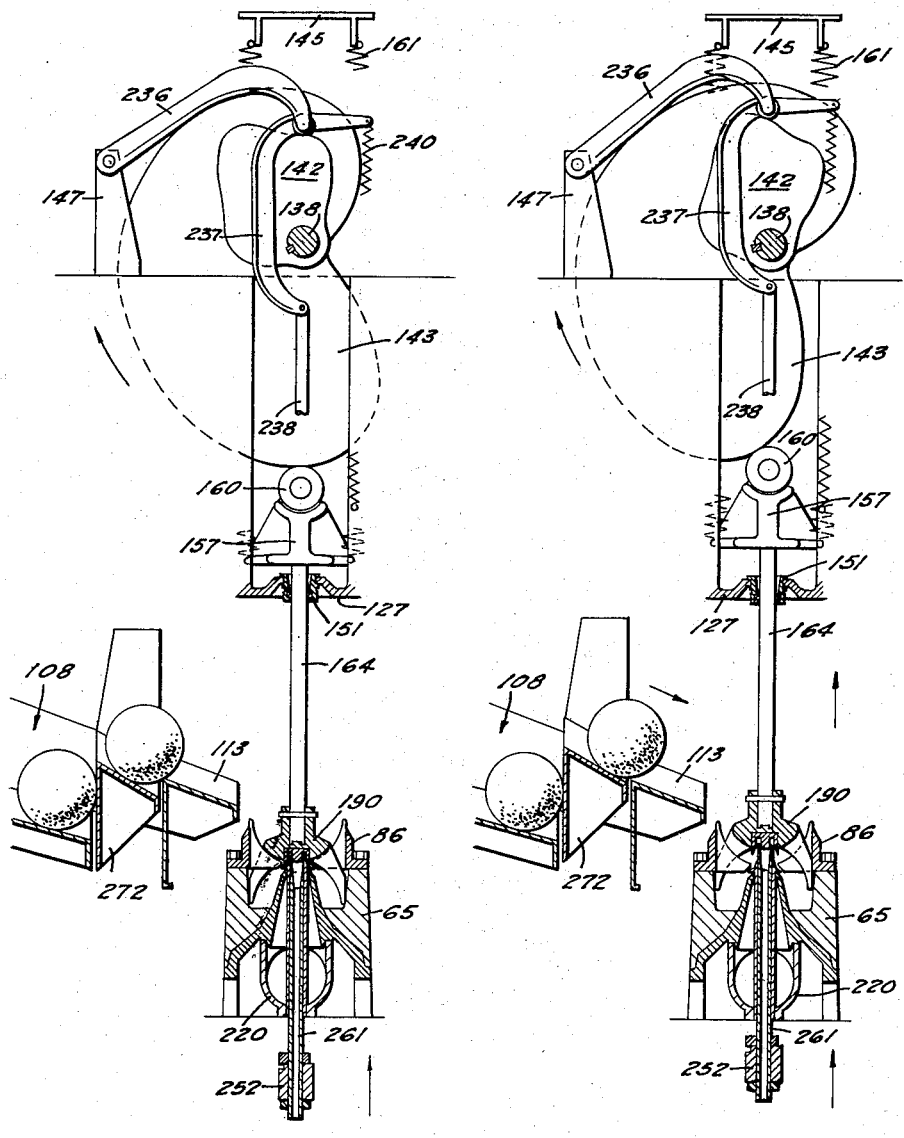

Aug. 25, 1953 J. M. HAIT 2,649,730
METHOD OF AND APPARATUS FOR EXTRACTING
JUICE FROM WHOLE CITRUS FRUIT
Filed Feb. 16, 1949 11 Sheets-Sheet 7

J. M. HAIT,
INVENTOR.

BY
ATTORNEY

Aug. 25, 1953  J. M. HAIT  2,649,730
METHOD OF AND APPARATUS FOR EXTRACTING
JUICE FROM WHOLE CITRUS FRUIT
Filed Feb. 16, 1949  11 Sheets-Sheet 8

J. M. HAIT
INVENTOR.

BY

ATTORNEY

Aug. 25, 1953  J. M. HAIT  2,649,730
METHOD OF AND APPARATUS FOR EXTRACTING
JUICE FROM WHOLE CITRUS FRUIT
Filed Feb. 16, 1949  11 Sheets-Sheet 11
FIG. 18.
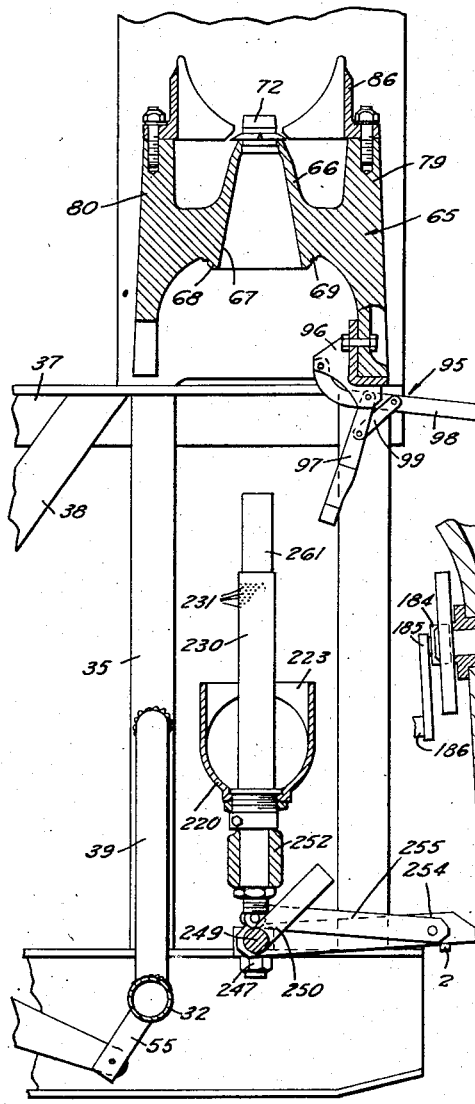
FIG. 19.
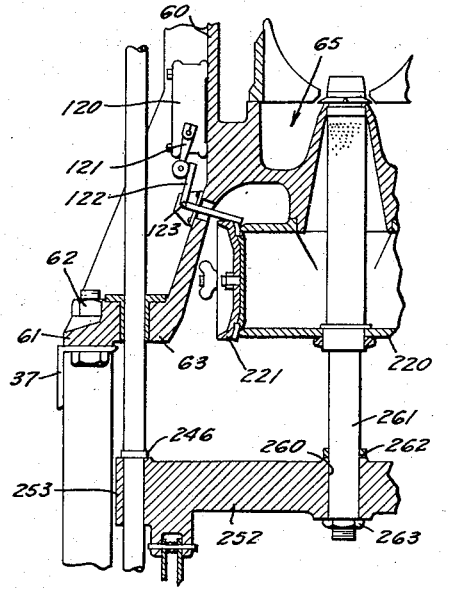
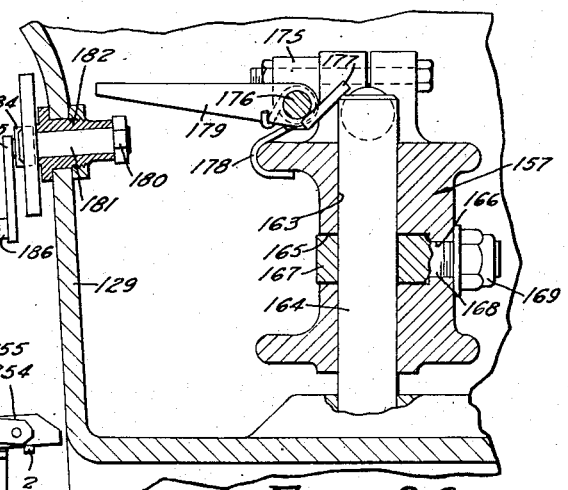
FIG. 20.
J. M. HAIT
INVENTOR.
BY
ATTORNEY Patented Aug. 25, 1953

2,649,730

UNITED STATES PATENT OFFICE 2,649,730

METHOD OF AND APPARATUS FOR EXTRACTING JUICE FROM WHOLE CITRUS FRUIT

James M. Hait, San Jose, Calif., assignor to Food Machinery and Chemical Corporation, San Jose, Calif., a corporation of Delaware Application February 16, 1949, Serial No. 76,748

17 Claims. (Cl. 100—37)

This invention relates to the art of extracting juice from whole citrus fruit. It constitutes improvements on the methods and apparatus disclosed in U. S. Letters Patent to Peterson No. 2,420,681 and to Pipkin No. 2,420,679, both issued on May 20, 1947.

Said patented inventions were directed to the extraction of juice from whole citrus fruit and represented generic advances in this art. Their basic operating principle was to form an opening in a whole citrus fruit and apply compressive forces to the exterior of the fruit to progressively reduce its volume and expel the juice from said opening while distributing said forces to bear on substantially the entire area of the rind whereby they also served to provide sufficient support to the rind to prevent the juice from bursting therethrough.

It is an object of the present invention to provide an improved process of and apparatus for extracting juice from whole citrus fruit which utilizes the basic operating principle disclosed in said Pipkin and Peterson patents.

In utilizing said principle, each of said patented inventions employed a pair of cups between which a whole citrus fruit was compressed to extract the juice therefrom after which the two cups were separated and the carcass or collapsed rind of the fruit was removed from between the cups before they could be used for another fruit dejuicing operation. The necessity for removing the fruit carcass from between the cups in the patented inventions required a considerable proportion of the cost of building the apparatus and operating the same, to be devoted to the carcass ejecting function. Furthermore, operational difficulties with said ejectors appeared to be unavoidable.

It is an object of the present invention to provide an improved process of and apparatus for extracting juice from whole citrus fruit utilizing the basic principle of said patented inventions but which eliminates the fruit carcass ejecting operation which formerly took place between successive juice extracting operations.

Following the operation of the aforesaid patented inventions in extracting juice from whole citrus fruit it was practically necessary to run the juice through a separate finishing step to eliminate objectionable solids from the juice before this was ready for consumption.

It is yet another object of the present invention to accomplish the separation of these solids from the juice extracted from whole citrus fruit incidental to the extraction operation thus eliminating the need for a separate juice finishing step and causing the juice to be immediately ready for consumption upon its leaving the extractor.

The manner of accomplishing the aforegoing objects, as well as further objects and advantages, will be made manifest in the following description taken in connection with the accompanying drawings in which:

Fig. 3 is an enlarged sectional view taken on the line 3—3 of Fig. 2.

Fig. 4 is a diagrammatic operational view illustrating the various elements of the apparatus disposed as at the beginning of a cycle of operation of a representative one of the three juice extracting units in said embodiment.

Fig. 5 is a view similar to Fig. 4 and illustrates the elements of the apparatus as they are disposed at a subsequent point in said cycle of operation in which the cups of said unit have just come into compressive conformation with a whole citrus fruit disposed therebetween causing a button to be cut from the rind of the fruit by the cutter of this unit, and in which the finishing plunger of said unit has been withdrawn downwardly to its lowermost position.

Fig. 6 is a view similar to Fig. 5 with the elements of the apparatus disposed at a further advanced point of time in a juice extracting operation in which the cups of said unit have shifted together to substantially contract the space occupied by the fruit therebetween (the fruit between the cups not being shown in this view or in Figs. 7, 8 and 9 because of the small scale of these views), this producing a constriction of the fruit and the expression of juice therefrom through the hole formed in the rind at the point of time illustrated in Fig. 5. Owing to the finishing plunger still being depressed, the juice thus expressed from the fruit and which passes into the perforated finishing tube of that unit has access to the holes in the latter through which the juice flows.

Fig. 7 is a view similar to Fig. 6 and illustrates the parts of the invention at a still further advanced point in said cycle of operation in which the space between the cups of said unit is further decreased and the finisher plunger thereof has risen to cover all but the uppermost of the perforations in the finisher tube of said unit.

Fig. 8 is a view similar to Fig. 7 and illustrates the parts of the invention at the moment when the cups have been brought to the point of their maximum interdigitation and showing the tubular cutter of the lower cup extending into the annular channel formed to receive the same in the upper cup.

Fig. 9 is a view similar to Fig. 8 and illustrates a subsequent point in the operation cycle in which the upper cup of said unit is being lifted and the finishing plunger thereof is shown as having been extended upwardly out of the button cutter and into the annular channel aforesaid of the upper cup.

Figures 10, 11, 12:
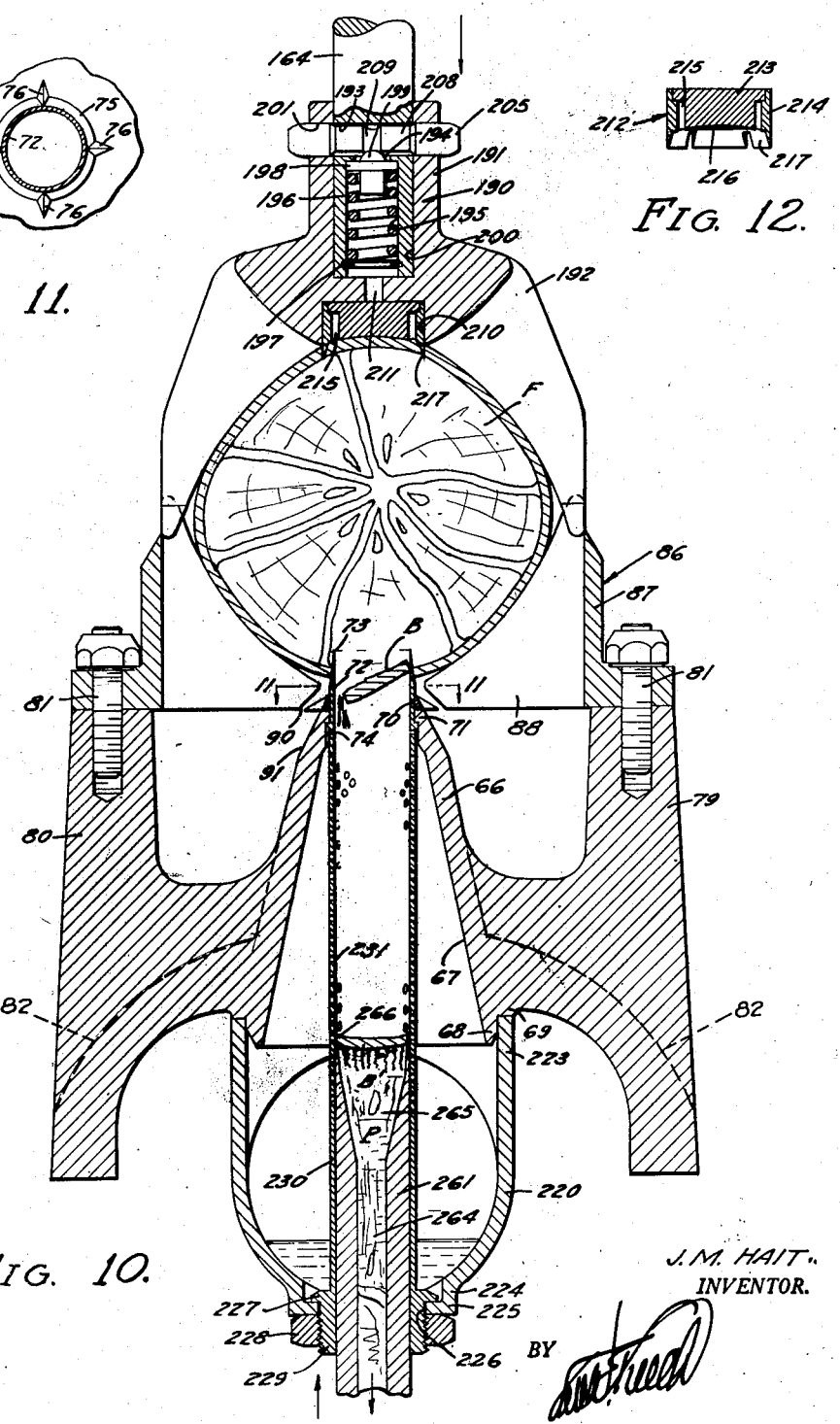

Fig. 10 is an enlarged fragmentary sectional operational view of the compressor cups and finisher mechanism of said unit of the invention with the parts thereof positioned as shown in Fig. 5.

Fig. 11 is a detailed sectional view taken on the line 11—11 of Fig. 10 and illustrates the rind ring cutting barbs of the invention.

Fig. 12 is a sectional view of a central insert provided in each of the upper cups of the invention in which the aforesaid annular channel is provided and on which are also provided rind penetrating spurs the function of which is to prevent the buckling of the rind within the area bounded by these spurs.

Figure 13:
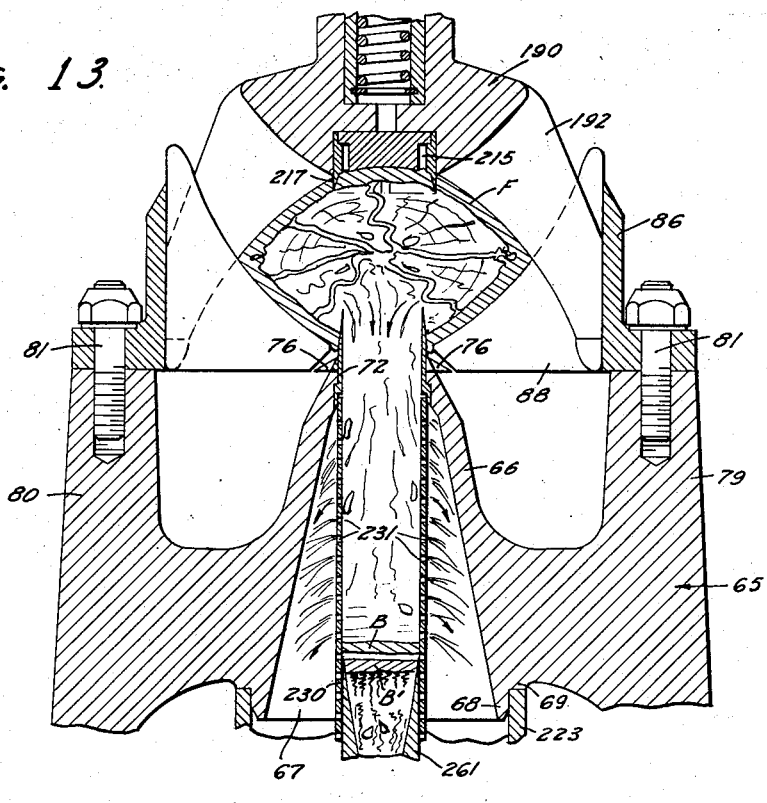

Fig. 13 is a view similar to Fig. 10 and illustrates the elements shown therein positioned as these are shown in Fig. 6.

Figure 14:
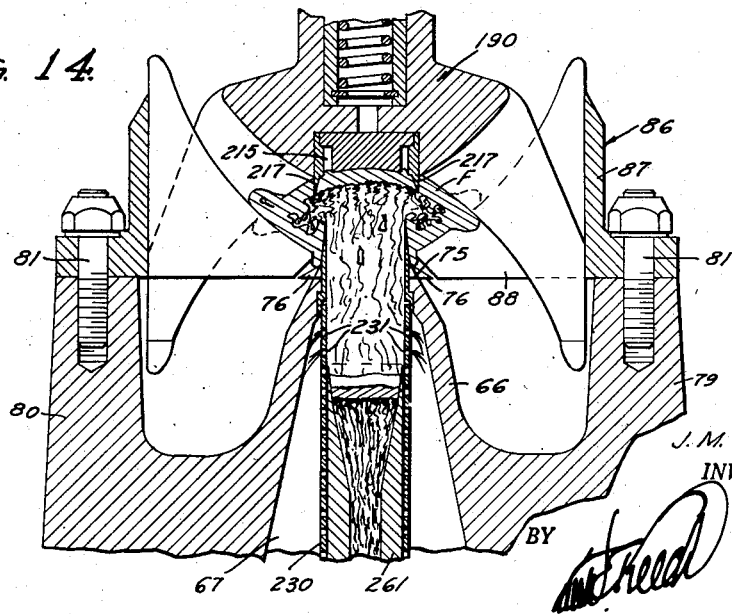

Fig. 14 is a view similar to Fig. 13 and shows the elements illustrated therein positioned as these are shown in Fig. 7.

Figure 15:
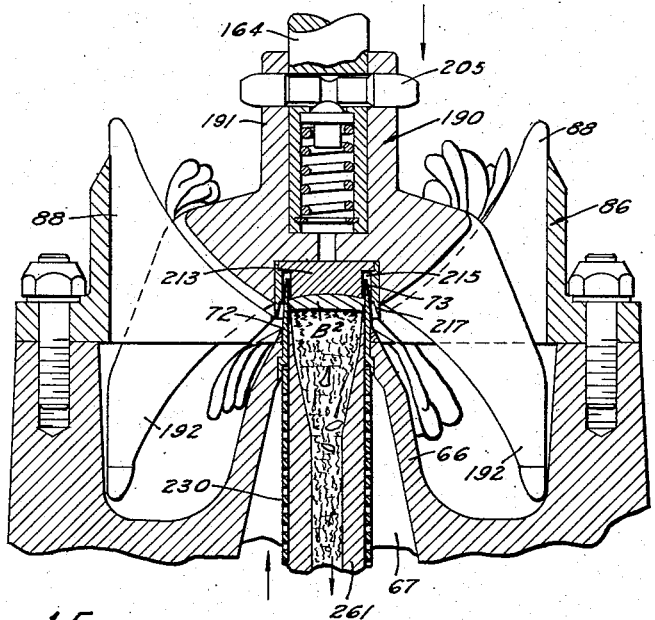

Fig. 15 is a view similar to Fig. 14 and shows the elements illustrated therein positioned as shown in Fig. 8.

Figure 16:
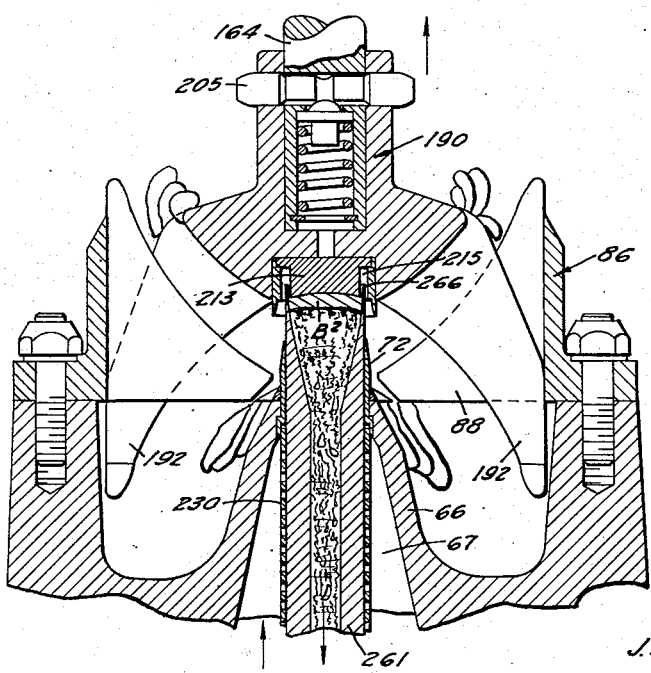

Fig. 16 is a view similar to Fig. 15 and shows the parts illustrated therein positioned as these are shown in Fig. 9.

Figure 17:
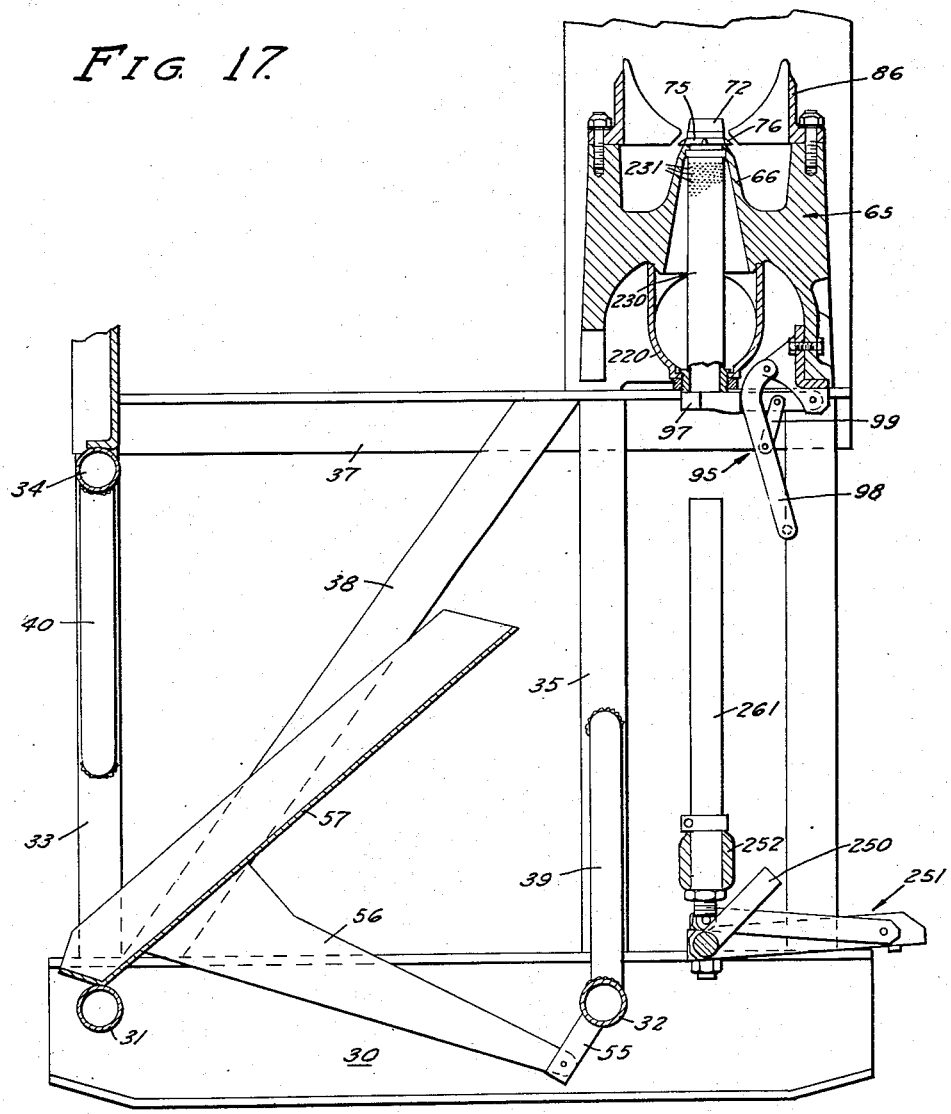

Fig. 17 is an enlarged fragmentary vertical sectional view of a lower portion of the apparatus of the invention with the finisher plungers of the invention released and allowed to slide downwardly out of the perforated finisher tubes in which they normally slide during juice extracting operations.

Fig. 18 is a view similar to Fig. 17 and illustrates the parts of the invention positioned as when the juice manifold is also released and allowed to slide downwardly on the finisher plungers to facilitate cleaning the machine.

Fig. 19 is a fragmentary diagrammatic sectional view of a portion of the apparatus of the invention taken on the line 19—19 of Fig. 3 and illustrating a safety switch embodied therein for preventing the starting of the motor whenever the juice manifold is not properly assembled for receiving the juice extracted by the machine.

Figure 2:
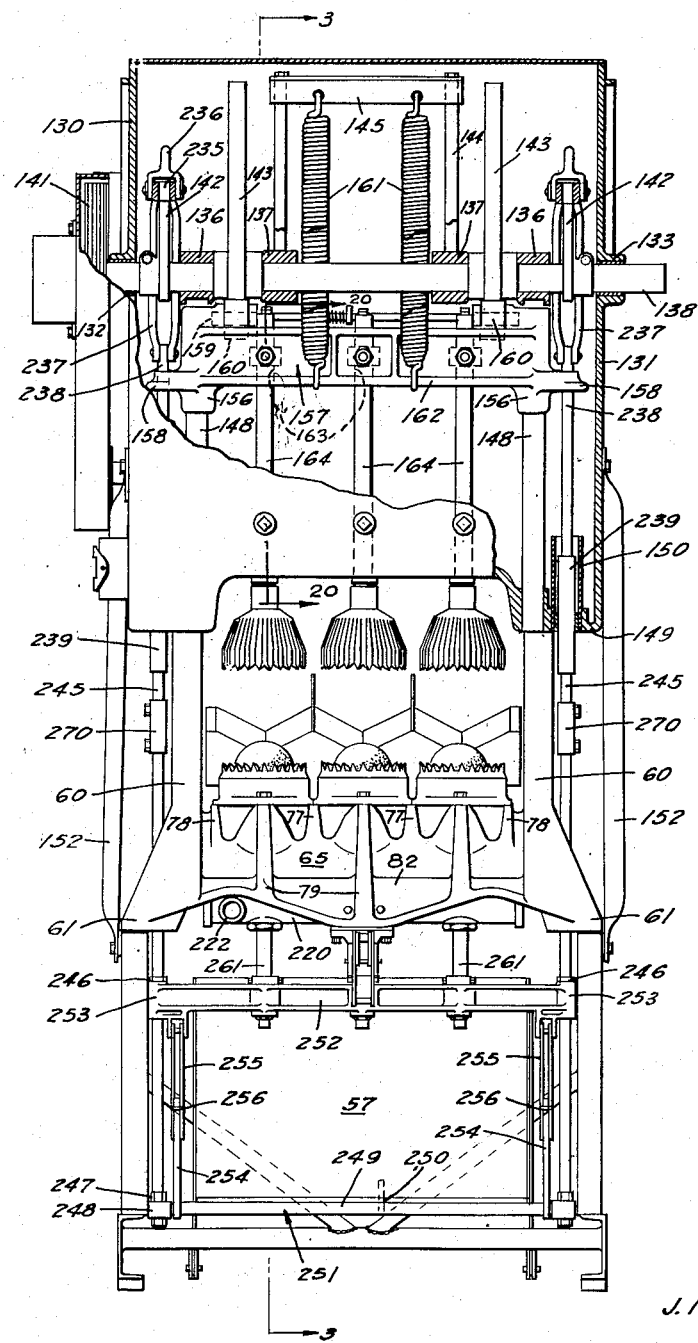
Fig. 2 is a front elevational view of Fig. 1 and partly in section taken on the line 2—2 thereof.

Fig. 20 is an enlarged diagrammatic sectional view taken on the line 20—20 of Fig. 2 with the parts of the invention disposed as at the point in an operating cycle illustrated in Fig. 8, this view illustrating in detail the mechanism for automatically stopping the apparatus when an obstruction to the maximum interdigitation of the compression cups causes a slippage of one of the cup reciprocating shafts of the invention in the clamp which secures it to the cup reciprocating cross head.

Referring specifically to the drawings, the apparatus of my invention is there shown as embodied in a juice extractor 25 having a frame 26 on which is fixed a cup bed casting 27, the latter supporting a power head 28.

The frame 26 has channel iron feet 30 which are united by spacer tubes 31 and 32 welded thereto. Welded to and extending upwardly from the feet 30 are rear posts 33, to which opposite ends of a horizontal spacer tube 34 are welded, and tubular posts 35 and 36 which are connected at their upper ends by angle iron members 37 welded thereto and to the posts 33. Diagonal braces 38 are also welded at their opposite ends to the feet 30 and members 37. Transverse diagonal braces 39 have their opposite ends welded to frame members 32 and 35, and transverse braces 40 have their opposite ends welded to members 33 and 34 to give transverse rigidity to the frame 26.

Mounted on the horizontal spacer tube 34, and extending upwardly therefrom, is a feed trough support 45 having two posts at its opposite edges on the upper ends of which are supported a pair of bearings 47 in which a vibrator shaft 48 journals. This shaft has an eccentric 49 formed centrally thereon and a drive pulley 50 which is connected by a belt 51 to the drive pulley of a motor 52 mounted on the support 45.

Welded on the spacer tube 32, and extending rearwardly and downwardly therefrom, are a pair of lugs 55 on which are pivoted the lower ends of arms 56 of a pulp-deflecting apron 57. This mounting permits the apron 57 to be optionally disposed in the position in which it is shown in Figs. 2 and 3, or to be swung rearwardly about its pivotal mounting into an out-of-the-way position as shown in Fig. 17.

Figure 1:
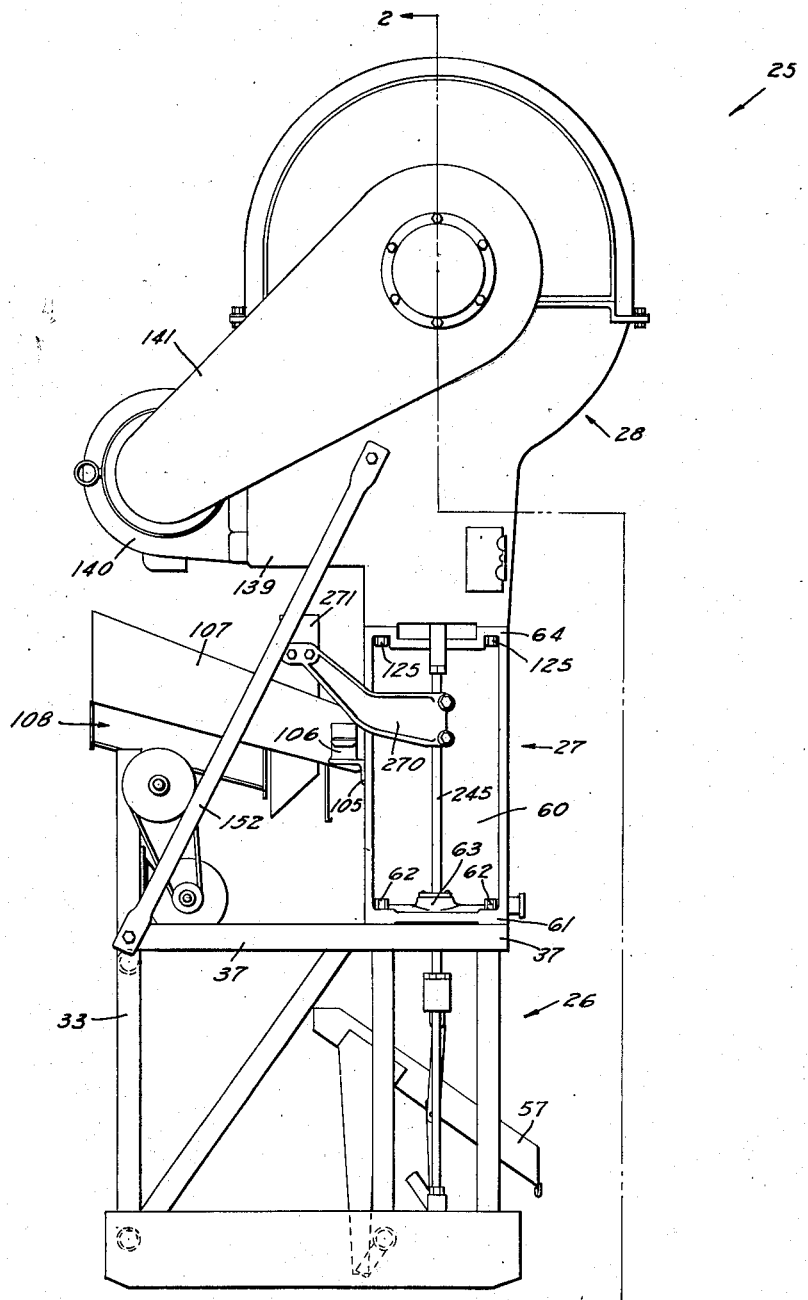
Fig. 1 is a side elevational view of a preferred embodiment of the invention.

The bed casting 27 has legs 60 which extend downwardly and outwardly at their lower ends to provide supporting shoulders 61 which rest upon the upper faces of angle iron members 37, and are secured thereto by bolts 62. The shoulders 61 are provided with vertical bearings 63 (Fig. 1). The legs 60 are provided at their upper ends with attaching shoulders 64.

The casting 27 also includes a cup bed 65 which extends horizontally between and is integral at its opposite ends with the legs 60.

Provided in the bed 65 is a series of three cutter supporting necks 66, each of which has a downwardly opening and flaring juice passage 67, said passage terminating at its lower end in a lip 68 which is surrounded by a shoulder 69.

Each of the necks 66 terminates upwardly in a horizontal face 70, and the upper end of the passage 67 is bored and counterbored cylindrically to provide an annular internal shoulder 71.

Pressed upwardly through said shoulder, and having a complementary annular external shoulder engaging therewith, is a thin-walled tubular button cutter 72. This cutter is ground down from the outside to form a sharp annular cutting edge 73 at its upper end. The lower end of the cutter 72 has an internal annular recess 74, the lower edge of which is beveled for a purpose which shall be made clear hereinafter.

Pressed downwardly about the cutter 72, until it rests upon the upper horizontal surface 70 of the neck 66, is an annulus 75 carrying a series of barbs 76 (preferably four in number), the latter extending radially from the annulus 75 and having horizontal lower surfaces and downwardly sloping faces which form cutting edges where these faces meet (Figs. 10 and 11).

Also provided by the cup bed 65 are a pair of pedestals 77 which are disposed between the middle neck 66 and those disposed laterally therefrom, and a pair of pedestals 78 which are disposed just inside of the legs 60 of the casting 27;

these pedestals lying in the common vertical axial plane of the necks 66, and terminating at their upper ends in horizontal surfaces lying in the same plane as the upper horizontal surfaces 70 of said necks.

The casting 65 also has front and rear pedestals 79 and 80, a pair of which lies in the fore and aft axial plane of each of the necks 66 and terminates at their upper ends in surfaces lying in said horizontal plane. The posts 79 and 80 are drilled and tapped to receive stud bolts 81.

As shown in Figs. 2 and 10 the cup bed 65 has surfaces 82 which slope outwardly and downwardly for shedding shredded rind deposited thereon as will be made clear hereinafter.

Resting on the upper horizontal faces of the pedestals 77, 78, 79 and 80, and secured in place by the bolts 81, are lower fruit compression cups 86, each of which is thus mounted in vertical coaxial relation with one of the necks 66. Each of these cups has an annular wall 87 from which a series of fingers or teeth 88 (preferably twenty-five in number), extend radially inwardly. These teeth are uniformly shaped and equally spaced circumferentially so that each adjacent pair of said teeth are separated by a slot which is slightly wider than the width of one of said teeth. The upper extremities of the teeth 88, where these project above the wall 87, are beveled as clearly shown in Fig. 2, the purpose of this being made evident hereinafter.

The teeth 88 terminate inwardly a short distance from the tubular cutter 72, and have lower beveled faces 90 which diverge downwardly relative to an adjacent outer beveled surface 91, which is formed partly on the annulus 75 and partly on an upper portion of the neck 66.

The front of the bed 65 extends downward to provide a central mounting for a manifold-supporting latch 95, this having a base 96 on which is pivoted a supporting yoke 97 and an operating arm 98, the latter being connected to said yoke by a link 99. The purpose of the latch 95 will be made clear hereinafter.

Fixed on the rear faces of the legs 60 are angle brackets 105 carrying blocks of rubber 106 on which are supported the front ends of side walls 107 of a triple-channeled fruit chute 108 which is supported centrally by a bearing 109 in which the eccentric 49 journals so that rotation of the shaft 48 by the motor 52 vibrates the chute 108 to facilitate the feeding of fruit thereover.

The chute 108 has three forwardly and downwardly sloping runways 110 which terminate forwardly at an open space 111, the latter being bounded at its forward limit by a vertical wall 112, the opposite ends of which are supported on the side walls 107, and from the upper edge of which three short elevated runways 113 slope forwardly and downwardly, said runways lying in the same fore and aft vertical planes as the runways 110, said planes also containing the axes of the respective necks 66 and lower compression cups 86 of the cup bed 65 described hereinabove.

Referring to Fig. 19, a switch 120 is mounted on one leg 60 of the casting 27, said switch having a roller arm 121, the roller of which is engaged by an arm 122 of a rocker 123, the latter being pivotally mounted on said leg and having another arm 124 which extends inwardly through a hole provided in said leg for a purpose which will be made clear hereinafter.

The power head 28 rests upon the attaching shoulders 64 at the upper ends of the legs 60, and is secured thereto by bolts 125. The power head has a base casting 126 including a bottom wall 127, a front wall 128, a rear wall 129 and end walls 130 and 131. Provided in said end walls are main shaft bearings 132 and 133.

Casting 126 also provides bulkheads 134 which extend inwardly from the walls 128 and 129, and provide shoulders 135 on which are mounted main shaft bearings 136 and 137. Journalled in the bearings 132, 133, 136 and 137 is a main cam shaft 138.

The casting 126 has a rearward extension 139 on which is mounted a geared motor 140 which is connected by a chain and sprocket drive mechanism 141 to the shaft 138.

Fixed on the shaft 138, between the bearings 136 and the bearings 132 and 133, are finisher actuating cams 142. Fixed on the shaft between the bearings 136 and 137 are upper cup actuating cams 143, the shapes and various operating positions of these cams being clearly shown in Figs. 3 to 9 inclusive.

Extending upwardly from bearings 137 are rods 144 which carry at their upper ends a spring support 145. Just inside of and close to the end walls 130 and 131, the casting 126 is provided with ledges 146 on each of which a standard 147 is fixed.

Inserted at their lower ends into bores provided in the bottom wall 127 of the casting 126, and at their upper ends into short bores provided in the bearings 136, are slide shafts 148.

Just inside each of the walls 130 and 131 the bottom wall 127 of the casting 126 has a slide bearing 149 and an oil shielding tube 150 which surrounds said bearing and extends upwardly coaxially therewith. As clearly shown in Fig. 2, the middle portion of the bottom wall 127 is shaped at a higher level than the end portions thereof, and is provided with guide bearings 151 which are disposed in coaxial alignment with the juice necks 66 of the cup bed 65.

The powerhead 28 is connected to frame 26, at the point of juncture between frame members 33 and 37, by a pair of tubular braces 152.

Bearings 156, provided at the opposite ends of a crosshead 157, slidably receive the slide shafts 148, and have guide bearings 158 extending laterally therefrom. Freely rotatable on stub shafts 159, which are provided on the crosshead 157, are cam follower rollers 160 which are aligned with and kept constantly in contact with the cams 143 by springs 161, the opposite ends of which are connected to the spring support 145 and to the lower flanges 162 of the crosshead 157.

The crosshead 157 is provided with three vertical holes 163 (Fig. 20) in which cylindrical plunger shafts 164 are slidably received. The crosshead is also milled out to provide three recesses 165, each of which cuts through a hole 163 and connects with a hole 166 for receiving a clamp ring 167 having a threaded stem 168 which extends through the hole 166 to receive a nut 169. By tightening the nut 169 to a particular degree of tightness, the clamp ring 167 is caused to bind against the shaft 164 extending therethrough and hold this in a fixed position in its hole 163 against any end-thrust normally imposed upon said shaft, yet permitting said shaft to slip through said ring when an abnormal thrust is imposed thereon.

Journalled at its ends in suitable bearings provided on the crosshead 157 is an automatic kickout shaft 176 having three lugs 177 welded thereto, each of which is held resting against and overlying the upper end of one of said shafts 164 (Fig. 20) by a spring 178 which is coiled around the shaft 176 with one end thereof hooked about an upper flange of the crosshead 157 and the other end thereof hooked about an arm 179 which is welded on the shaft 176 and normally extends horizontally therefrom.

In vertical alignment with the arm 179, and disposed just below this arm when the crosshead 157 is in its lowermost position, as shown in Fig. 20, is a horizontal arm 180 which is provided on a shaft 181, the latter journalling in a bearing 182 which is provided in the wall 129, said shaft having a disc fixed on the outer end thereof, said disc having a single notch in its periphery into which the roller 184 of a switch arm 185 of a kickout switch 186 is normally spring-pressed by the spring of said switch. The purpose of the mechanism just described will be made clear hereinafter in describing the operation of the juice extractor 25.

The shafts 164 extend downwardly through the guide bearings 151 and each of these has mounted upon its lower end an upper fruit compressing cup having a hub 191 from which radiate a series of fingers or teeth 192, which are equal in number to the teeth 88 of the cup 86 associated therewith, and which are separated by uniform slots slightly wider than said teeth, each cup 190 being fixed on its shaft 164 so that when said cup is shifted downwardly the teeth of this cup come into interdigitating relation with the teeth of the cup 86 immediately therebelow, which is in axial alignment therewith. The lower extremities of the teeth 192 are symmetrically beveled to assist in guiding said cups into interdigitating relation as they are brought together.

Each cup 190 is mounted on its shaft 164 in the following manner. The lower end of this shaft has a diametral hole 193 (Fig. 10) which is connected by an axial hole 194 with a larger axial hole 195 in the lower end of the shaft 164. Held against the upper end of the hole 195 by a spring 196, which is trapped in said hole by a split ring 197 in the mouth thereof, is a detent 198, a knob 199 of which is thus caused to extend through the hole 194 and into the hole 193.

The hub 191 of the cup 190 has an axial bore 200 for receiving the lower end of its shaft 164, the hub also having a diametral hole 201 which may be brought into alignment with the hole 193 when the shaft 164 touches the bottom of the bore 200.

For retaining a cup 190 properly assembled on its shaft 164, a pin 205 is provided, opposite end portions of which have a snug sliding fit within the hole 201 but a central portion 208 of which is of reduced diameter so as not to contact any portion of the hole 193 when the pin 205 is centralized as shown in Fig. 10. When the pin is thus positioned, an annular groove 209 provided in the middle thereof receives the detent knob 199 so as to hold the pin in place and place the spring 196 under a slight degree of compression. The spring 196 thus holds the pin 205 in place to secure the cup 190 on the shaft 164 yet permits a slight degree of rotation of the cup on the shaft whereby this cup may accommodate itself to its mating cup 86 and move smoothly into interdigitating relation therewith.

The hub 191 of the cup 190 is also provided with a shallow axial bore 210 which is connected with the bore 200 by a knockout hole 211. Inserted into the bore 210 with a press-fit is a plug 212 (Fig. 12) formed of two parts, a core 213, and a sleeve 214 which interfit so that the friction between the sleeve 214 and the bore 210 holds the core 213 in place. A portion of the core 213 is turned down to provide an annular channel 215 in said plug. The lower face 216 of the core 213 is slightly concave. Extending downwardly from the lower edge of the sleeve 214 is a series of circumferentially spaced spurs 217, the purpose of which will be made clear hereinafter.

Adapted to be supported in place by the yoke 97 of latch 95 is a tubular juice manifold 220 which is generally cylindrical in shape and is provided with removable caps 221 (Fig. 19) at its opposite ends. The manifold 220 also has an outlet spout 222 from which juice collected therein flows. The manifold 220 also has a series of tubular mouths 223 (Fig. 10) which are adapted to fit over the lips 68 and against the shoulders 69 of the respective cutter supporting necks 66.

Formed downwardly from the manifold 220, in axial alignment with each of the mouths 223, is a boss 224 which is machined from the inside and on the outside to provide a horizontal wall 225 having a central aperture 226. Inserted into said aperture, so as to bring a shoulder 227 thereof into engagement with the upper face of the wall 225 and receive a nut 228 on its downwardly extending end, is the threaded mounting nipple 229 of a thin-walled finisher tube 230, which extends upwardly into the annular recess 74 formed in the lower end of the tubular cutter 72 associated therewith. The walls of the tube 230 from the upper end thereof down to a point a slight distance below the lower end of the juice passage 67, are provided with closely spaced small perforations 231.

The manifold 220 is held in its proper assembled relation with the cup bed 65 by swinging the handle 98 of the latch 95 inwardly into the position in which this is shown in Fig. 15, thereby lifting the yoke 97 to engage the central nipple 229 of the manifold 220 and press upwardly on this, the final inward movement of the operating arm 98 bringing this into engagement with the yoke 97 with the latter locked in manifold supporting position.

To disassemble the manifold 220 from the lower cup bed 65, the arm 98 (Fig. 17) is merely swung outwardly and upwardly thus permitting the yoke 97 to swing downwardly and outwardly (Fig. 18) whereby the manifold 220 may be readily lowered from its assembled relation with the cup bed 65 and, if desired, removed separately from the machine.

In the balance of the description of the machine, it will be assumed that the manifold 220 is assembled with the cup bed 65 as shown in Figs. 10 and 17.

Pivotally supporting cam follower rollers 235 in contact with the upper surfaces of the cams 142 is a pair of bifurcated arms 236 which are pivotally connected at their opposite ends to the upper ends of the standards 147. Extending between each roller 235 and the forked ends of its arm 236, and pivoted on the same axis relative to said arm 236, is a pair of links 237, lower ends of which are pivotally connected to the flattened upper end of one of a pair of shafts 238, these shafts sliding in bearings 158 and connecting at their lower ends with couplings 239 which are slightly larger in diameter than said shafts and slide in bearings 149.

The upper ends of links 237 extend forwardly and the upper ends of contractile springs 240 connect thereto, the lower ends of said springs being attached to suitable pins provided on the casting 126. Thus two springs 240 are constantly pulling downward on each of the rollers 235 and holding this roller in contact with its respective cam 142.

Connecting with the lower ends of the couplings 239 are shafts 245 which are guided by the slide bearings 63 and extend downwardly therebelow to a level close to the feet 30 of the frame 26.

Provided on the shafts 245, below the bearings 63, are stop collars 246. Apertured to receive the lower ends of the shafts 245 and held in place thereon by nuts 247 (Fig. 2) are bearings 248 in which opposite ends of a cross shaft 249 journal. This shaft has a handle 250 and constitutes the operating shaft of a mechanism 251 for elevating and supporting snugly against the stop collars 246 a cross-beam 252 on opposite ends of which are provided bearings 253 which slidably receive shafts 245.

Included in the mechanism 251 is a pair of arms 254 which are fixed on opposite ends of the shaft 249 and the upper ends of which are pivotally connected to links 255, upper ends of which are pivoted to the beam 252. Stop lugs 256 are provided on the arms 254 which halt relative rotation of the arms 254 and links 255 when the latter have reached an extended, over-dead-center relation in which they hold the beam 252 upwardly snugly against the collars 246.

The beam 252 is provided with a series of vertical holes 260 which are in axial alignment with the three juice compression units of the machine 25, and have mounted therein tubular finisher plungers 261 which are held in place by clamps 262 fixed thereon just above the beam 252, and nuts 263 which are threadedly received on the lower ends of said plungers. When the machine 25 is assembled, as shown in Figs. 2, 3 and 10, plungers 261 extend upwardly into the finisher tubes 230 with a close sliding fit therewith. Each plunger 261 has an axial bore 264, the upper end of which is taper-reamed to form a tapered mouth 265 which terminates at the upper end of the plunger 261 in a sharp annular cutting edge 266.

Clamped on the shafts 245 a short distance below their juncture with coupling 239 are shuffle feeder supporting arms 270 to each of which is connected one of two inverted U-shaped side walls 271 of a shuffle feeder 272, each of the side walls 271 extending inwardly-across and downwardly-inside-of the adjacent side wall 107 of the multiple runway fruit chute 108. The shuffle feeder 272 has three fruit runways 273 which are disposed respectively in alignment with the runways 110 and 113 of the multiple chute 108.

The shuffle feeder 272 has a rear vertical wall 274 which, when the feeder is in up position, blocks the downward gravitation of fruit from the runways 110.

The powerhead 28 is preferably provided with a sheet metal cover 275 (Fig. 3).

*Operation*

Switches 120 and 186 are normally closed and are in the holding circuit of the motor switch controlling the motor 140 so that when either of these switches is actuated, in a manner to be pointed out hereinafter, this circuit is broken causing the motor switch to throw-out and the machine to stop.

With the motor 140 energized, the shaft 138 is rotated preferably at a rate of about 30 R. P. M., although this is variable depending upon the character of the fruit being handled. With each revolution of shaft 138, the cams 143 act on the crosshead 157 through the rollers 160 to reciprocate the crosshead downwardly and upwardly between its uppermost position, in which it is shown in Fig. 2, and its downwardmost position, in which it is shown in Figs. 8 and 20. This reciprocates the cups 190 from their upper most positions, in which they are shown in Figs. 2, 3 and 4, and their lowermost positions in which they are shown in Figs. 8 and 15. Each revolution of the shaft 138 also produces a complex vertical movement of the plungers 261. Starting with these positioned as shown in Figs. 2, 3 and 4, this movement begins with a downward movement to the position in which these plungers are shown in Figs. 5 and 10, followed by these plungers being elevated to the positions in which they are shown in Figs. 9 and 16, after which they are returned downwardly to their starting position, as shown in Fig. 4.

A whole citrus fruit, such as an orange, grapefruit, lemon or tangerine, is fed into the lower cup 86 of each of the three compression units of the machine while the upper cups 190 are spaced upwardly from the lower cups 86, this feeding being accomplished by the vertical reciprocation of the shuffle feeder 272 with the shafts 245 on which said feeder is mounted. This feeding is accomplished by each trough 273 of the shuffle feeder 272 receiving a piece of fruit when the feeder moves downwardly as shown in Fig. 5, this piece of fruit being elevated as the feeder rises so as to gravitate from the feeder troughs 273 into the elevated stationary troughs 113 from each of which a piece of whole fruit then rolls directly into the lower compression cup 86 aligned therewith.

In Fig. 9, the feeder is shown as elevated with the pieces of fruit rolling therefrom onto the elevated stationary troughs 113, while the upper cups 190 are just starting to rise. This is so that as soon as the upper cups have risen a sufficient distance to permit the fruit to pass therebeneath, the fruit will be moving downwardly so as to be deposited in the lower cups by the time the upper cups 190 start downwardly.

Fig. 4 illustrates the beginning of an operating cycle and shows the relation then existing between the parts of a single compression unit, and the operative elements of the powerhead, and with a whole citrus fruit F already fed into the lower cup of said unit.

Fig. 5, and its enlarged counterpart, Fig. 10, illustrate the point of time in said cycle at which the upper cup 190 has descended to the point where it has centralized the whole fruit F between the two cups, brought the fruit into substantial conformation with the inner surfaces of the two cups, and applied sufficient pressure to the fruit to cause the cutter 72 to penetrate the rind of the fruit and cut a button B therefrom. At this time it will be noted that the plunger 261 has withdrawn downwardly to provide a substantial free space in the upper perforated portion of the finisher tube 230.

The conformation of the fruit F to the cups 86 and 190 also impales the rind of the fruit on the spurs 217, the purpose of this being to prevent the wrinkling of the rind in the central area surrounded by said spurs as a result of the subsequent constriction of the fruit between the cups.

It is to be noted that at the point of time illustrated in Fig. 10, the axial bore 264 and its flaring mouth 265 are filled with pulp P, while the upper end of said mouth contains a button B₁ which is the pulp and the final button cut from a previously compressed whole citrus fruit.

Immediately following the point of time illustrated in Fig. 10, the cup 190 continues downwardly to force the pulpy juice-bearing internal structure of the fruit F downwardly through the cutter 72 into the finisher tube 230, as shown in Fig. 13. This forces the rind button B downwardly against the rind button B₁, and forces the juice from this pulpy structure outwardly through the holes 231 formed in the finisher tube 230. This juice flows downwardly into the manifold 220 and is discharged from the spout 222 thereof into a pipeline connected therewith or into a suitable container positioned to receive the same.

Immediately following the point of time illustrated in Figs. 6 and 13, the cams 143 lift the finishing plungers 261 upwardly to compress the pulp from the fruit F in the finisher tube 230, this compression reaching a point, before the upper end of the plunger has covered all of the holes 231 in the finishing tube 230, where a relatively high percentage of the juice of the fruit F has been squeezed from the pulp and has escaped outwardly through the holes 231 into the juice passage 67.

This point of time in the pressing cycle is illustrated by Figs. 7 and 14. Fig. 14, owing to its enlarged scale, illustrates the shredding of the rind of fruit F which has already started to take place due to the high degree of pressure to which the fruit is subjected by the two cups, and to the presence of slots between adjacent fingers of the two cups into which ribbons of the rind are sheared by the shearing relation of adjacent fingers of the two cups as the interdigitating relation between these progresses.

Figs. 8 and 15 illustrate the point in the cycle of operation where the interdigitation between the two cups has reached its maximum, and that portion of the rind and other solid constituents of the fruit which has not been forced by the upper cup downwardly into the cutter 72, is extruded out through the slots between the fingers of the two cups and through the annular space between the cutter 72 and the inner tips of the teeth 88 of the lower cup 86.

The rind and pulpy matter thus extruded through the slots in the cups, falls downwardly on the sloping surfaces 82 of the cup bed 65 and is shed outwardly therefrom before enough of this can accumulate to choke up the space immediately around the necks 66 and beneath the lower compression cups 86. The apron 57 is positioned to receive this extruded matter which gravitates downwardly therefrom onto a conveyor belt (not shown) leading to a bin for collecting the extruded matter or to a plant for processing this to convert it into cattle food or some other useful by-product.

Any tendency of a portion of the rind or other solid matter of the fruit which is forced downwardly through the space between the cutter 72 and the inner tips of the lower cup teeth 88 to retain continuous endless form so as to extend entirely around the neck 66 and thus build up a layer thereon which would necessitate frequent cleaning, is obviated by the provision of the cutting barbs 76 which extend out into this space and divide up the pulpy matter extruded downwardly through said space into four sections so that it will readily fall away from the neck 66 and be carried downwardly by gravity with the successive accretions of pulpy material extruded downwardly in subsequent fruit compression cycles.

The final downward movement of the upper cup 190 presses the portion of the rind of the fruit F which is encompassed within the spurs 217 downwardly through the level of the cutting edge 73 of the cutter 72 so that said edge extends into the annular channel 215 of the upper cup 190. This causes said cutter to cut a rind button B₂ from said fruit F, and the core 213 of the upper cup pushes this button downward well within the upper portion of said cutter.

Figs. 10, 13, 14, and 15 clearly illustrate the progressive travel inward toward the common axis of the two cups 86 and 190 of the radially innermost points of interdigitation between the teeth 88 and 192 of said cups. This radial inward travel of said innermost points of interdigitation of the fruit engaging edges of said teeth accomplishes the constriction of the whole fruit F placed between said cups and terminates with a substantially maximum degree of interdigitation between the teeth of said cups as shown in Fig. 15. In this view, it is manifest that the space which had accommodated a whole fruit between said cups when the latter were starting their interdigitation (Fig. 11) has now been reduced practically to the vanishing point. This degree of constriction is made possible by locating the radially innermost extremities of the teeth of both of said cups at substantially the same radius from the common axis of said cups, and then shaping the slots between the teeth of each of said cups to provide space for unimpeded movement thereinto of the teeth of the other cup to allow the innermost points of the interdigitation between the teeth of said cups to progress radially inwardly substantially to the innermost extremities of said teeth of said cups.

While the point of maximum interdigitation between the cups, illustrated in Fig. 15, does not show the space confined by the fruit contacting edges of the teeth of the two cups reduced to zero, this space has been reduced to such a small fraction of its original volume that it may be said that it has been substantially reduced to zero. It is to be noted, however, that the construction of the two cups is such as to permit their coaxial approach to each other to be carried to a further point than illustrated in Fig. 15 and in which the aforementioned space would literally be reduced to zero.

Following the point of time illustrated in Fig. 15, the upper cup 190 starts to return to its upwardmost position but the finisher plunger 261 continues to rise and overtakes the upper cup so that the upper cutting edge 266 of this plunger is extended upwardly into the annular channel 215 of the said cup so that the core 213 thereof extends into the upper end of the mouth 265 of said plunger and presses the rind button B₂ well down into said mouth as shown in Fig. 16. From the point at which the cams 142 and 143 are positioned in Fig. 9, the compression cycle is concluded by the upper cup 190 moving upwardly to its starting position and the finisher plunger 261 moving down to its starting position, as shown in Fig. 4.

By virtue of the extrusion of all that portion of the rind and solid materials in the fruit F through the open spaces in the two cups 86 and 190, excepting the pulp and rind buttons which are necessarily forced downwardly through the plunger 261, the space between the pressure cups is free of obstruction by a rind carcass which used to remain between the compression cups and had to be removed by hand or by a separate stripping mechanism in the apparatus in the aforesaid Peterson and Pipkin patents. Thus no carcass-stripping operation is required in my invention, and such an operation is entirely dispensed with therein.

At the conclusion of each compression cycle when the upper cup 190 returns to its uppermost position, as shown in Fig. 4, a fresh whole fruit F is fed into the lower cup, and the compression cycle just completed is followed by another just like it without any portion of the solid matter of the fruit previously compressed remaining to interfere with the second cycle.

Another great advantage of my invention is to be found in the screening or finishing of the juice extracted from the fruit by compressing the pulp above the plunger 261 so as to force the juice in this pulp outwardly through the holes 231 formed in the finishing tube 230, and thus separating from the juice all of the pulpy material extracted with the juice from the fruit. Thus the pulpy material all is discharged downwardly from the lower ends of the finishing plungers 261 onto the apron 57 from which it gravitates onto a conveyor belt which carries the pulp to a bin provided to receive this.

The juice, on the other hand, flows from the manifold 220 through the manifold spout 222 in a finished condition and ready for bottling, canning or immediate consumption.

Another advantage of the apparatus of my invention herein disclosed is the facility with which the parts exposed to rind oil and juice may be steam cleaned at the end of a day's run so that the metal will not tarnish or become gummed-up with the components of the fruit passed through the machine.

To facilitate such a cleaning operation, the apron 57 is swung backwardly out of the way, as shown in Fig. 17, and the arm 250 is pulled outwardly rocking the shaft 249 and thus releasing the latch mechanism 251 and causing this to collapse, permitting the crossbeam 252 and the finishing plungers 261 carried thereon to drop downwardly as shown in this view. Steam can then be applied to the plungers 261 to clean these both inside and out.

The end covers 221 may then be removed from the manifold 220, and this cleaned out by steam as far as possible while still supported in its assembled position as shown in Fig. 17. It is optional, however, to remove the manifold 220 and separately clean this after which it may be slidably assembled downwardly on the plungers 261, as shown in Fig. 18. To reassemble the cleaned machine, the latch mechanism 251 can be extended to elevate the crossbeam 252 against the stop collars 246 following which the manifold 220 may be lifted into its assembled relation with the cup bed 65, and the manifold-supporting latch 95 swung into the position shown in Fig. 3, to support said manifold. The apron 57 is now swung forwardly and the juice extractor 25 is completely reassembled after the cleaning operation in readiness for starting a new run.

The vibration of the multiple fruit feed runways 108 by the power-driven eccentric 49 keeps the fruit moving along the runways 110 and 113, and this assures uniform feeding of the fruit to the cups 86.

It is to be noted also that the finishing of the juice depends upon a restricted pulp passage being provided axially in the plungers 261. The size of this may be varied as by caps with orifices varying in diameter which are screwed onto the lower ends of the plungers 261. The degree of restriction must be such as to provide compression of the pulp in the finishing tube sufficient to extract most of the juice therefrom, yet large enough to permit the pulp and rind buttons to pass therethrough without creating too much back pressure.

The cutout switch 120 operates to safeguard the operation of the juicer 25 by halting the motor 140, if it is running, or making it impossible to start said motor if it is not running, whenever the manifold 220 is released from its upward assembled relation with the cup bed 65 in which it is shown in Fig. 19. Fig. 18 shows the manifold 220 when it is released from the assembled position and allowed to ride down with the crossbeam 252, upon the relaxing of the supporting latch 251, thereby opening said switch.

The switch 186 is provided to likewise render the motor 140 inoperative whenever one of the shafts 164 meets with such a resistance on its downward movement as to cause this shaft to slide upwardly through its clamp ring 167. The most likely cause of this is where solid objects, such as metal tools, fittings and the like, accidentally gain access to the machine and are fed in between a pair of the compression cups 86 and 190. Where such a resistance is set up to the downward movement of one of the shafts 164, this slides upwardly in its clamp ring 167 and rotates the shaft 176 through the lug 177 provided thereon and normally overlying that shaft 164 (Fig. 20). This rotation of the shaft 176 depresses the finger 179 to cause this to engage the finger 180 and rotate the shaft 181 and the notched disc 183 fixed on the outer end thereof. This swings the arm 185 and opens the switch 186 thereby stopping the machine.

I claim:

1. A method of extracting juice from a fresh whole citrus fruit which comprises the steps of forming an opening in the rind of the fruit for the escape of juice therefrom, applying compressive forces to the exterior of the fruit to progressively reduce its volume and expel the juice of said fruit from said opening, distributing said compressive forces to simultaneously bear at closely spaced points on substantially the entire area of the rind excepting the area of said opening whereby the forces also serve to provide sufficient support to the rind to prevent the juice from bursting therethrough, developing a diffused pattern of relatively narrow spaces at said rind area in which said compressive forces are not applied to said rind, and continuing the application of said compressive forces to said rind to the point where substantially all the remaining solid constituents of said fruit are substantially entirely extruded outward through said narrow spaces.

2. In a device for extracting juice from whole citrus fruit, the combination of: a pair of opposed co-axial cups having hemispheroidal bowl cavities, the side walls of each cup comprising a multiplicity of elongated, narrow teeth separated by correspondingly narrow slots, the teeth of each cup being aligned with the slots of the other cup for interdigitation and the bowl cavities of said cups being shaped to conformably contact substantially the entire outer surface of the whole fruit upon initial interdigitation of said teeth, at least one of said cups having an axial passage communicating with the interior thereof through which juice may escape from the fruit as such interdigitation proceeds, the slots between the teeth being formed to permit progressive interdigitation of said teeth to express the juice from the fruit through said passage without the fruit bursting between the teeth, the inner extremities of the teeth and slots of said two cups lying substantially the same radial distance from the common axis of said cups, said slots of each cup providing for unimpeded movement thereinto of the teeth of the other cup to a point of interdigitation, in which the slots extend substantially to the innermost extremities of said teeth of said cups whereby the portions of the rind of said fruit excepting that which overlies said passage are substantially entirely extruded through said narrow slots, and the portions of said rind overlying said passage are forced into said passage.

3. A combination as in claim 2 in which a tubular cutter is provided in said cup having said passage, said cutter defining said passage and extending into said cup to cut a button from the rind of said fruit when the latter is initially compressed between said cups, there being a channel provided in said other cup which conforms to and receives the edge of said cutter when said cups are at the maximum point of their interdigitation to cut a second button from the rind of said fruit and press said second button through said cutter into said passage.

4. A combination as in claim 3 in which a finisher tube having substantially the same inside diameter and shape as said cutter tube constitutes an extension of the latter, said finisher tube being perforated; and a finisher plunger having a hole formed longitudinally therein and slidably disposed in said finisher and cutter tubes; and means to reciprocate said finisher plunger in timed relation with the relative movement between said cups to extend said plunger from said cutter tube and into said channel to press the pulp received by said cutter from said fruit into the longitudinal hole provided in said finisher plunger.

5. A combination as in claim 4 in which said finisher plunger has a sharp inner edge, which operates close to the inner surfaces of said tubes, a restricted throat being provided in said longitudinal plunger hole which restricts the passage of pulp through said hole thereby building up pressure which, when applied to said pulp, expresses juice from said pulp causing it to flow through said perforations in said finisher tube before the latter are shut off by said finisher plunger moving into closing relation with these.

6. A combination as in claim 2 in which said passage is disposed axially of the cups and has a tubular cutter defining said passage and extending into the cup having said passage, there being a free annular gap surrounding said tubular cutter at and below the lowermost extremity of the bowl cavity of the latter cup, said annular gap entirely separating said teeth and said tubular cutter and connecting the space within the lowermost portion of said bowl cavity with a free space below said teeth for receiving extruded rind.

7. A combination as in claim 2 in which said passage is disposed axially in one of said cups and has a tubular cutter defining said passage and extending into said cup, there being a free annular gap surrounding said tubular cutter at and below the lowermost extremity of the bowl cavity of said cup, said annular gap entirely separating said teeth and said tubular cutter and connecting the lowermost portion of the interior of said bowl cavity with a free space located below said teeth for receiving extruded rind, and a rind ring cutting barb extending radially into said free annular gap for radially severing a ring of rind extruded downwardly through said annular gap.

8. A combination as in claim 2 in which the cup having said passage is provided with a tubular cutter which defines said passage and extends into said cup, there being an annular channel formed in said other cup which is adapted to receive said cutter when the maximum interdigitation of said cups is reached; and spurs provided on the cup having said channel and disposed outwardly therefrom, said spurs extending into said cup to penetrate the rind of said fruit when the latter is first brought into conformation with said bowl cavities so that the buckling of said rind produced by the radical constriction thereof accompanying the subsequent interdigitation of said cups may not be transmitted to that portion of said rind within the area surrounded by said channel, said spurs thereby facilitating the cutting of a second button from an undistorted portion of said rind surrounded by said spurs.

9. A combination as in claim 2 in which the cup having said passage includes a central portion providing said passage, and an annular tooth mount on which the teeth of said cup are supported by their outer edges, said teeth extending radially inwardly from said mount and being completely separated from said central cup portion to provide an annular gap between the inner extremities of said teeth and said central cup portion which connects the space within the bowl cavity of said cup with a free space located beneath said teeth for receiving rind extruded downwardly from said bowl cavity between said teeth and through said gap.

10. In a device for extracting juice from whole citrus fruit, the combination of a pair of opposed cups having hemispheroidal bowl cavities, the side walls of each cup comprising a multiplicity of elongated narrow teeth separated by correspondingly narrow slots, the teeth of each cup being aligned with the slots of the other cup for interdigitation and the bowl cavities of said cups being shaped to conformably contact substantially the entire outer surface of the whole fruit upon initial interdigitation of said teeth, a tubular cutter being provided on one of said cups and extending thereinto to form a hole in the rind of said fruit when the latter is compressed between said cups, whereby subsequent progressive interdigitation of said teeth expresses the juice from the fruit through a juice passage formed by said cutter without the fruit bursting between said teeth; a perforated finishing tube disposed close to and connecting directly with said cutter outside of said cup to receive pulp and juice expressed from said fruit into said juice passage; means forming a closed juice receiving chamber surrounding the perforated portion of said tube; a plunger reciprocably mounted in said finishing tube; and means for reciprocating said plunger in timed relation with the relative movement between said cups whereby said plunger is moved in said tube toward said cutter during the final portion of a fruit compressing operation to compress the pulp which had been delivered from said fruit into said finishing tube whereby the juice in said pulp is expressed therefrom and discharged outwardly through the perforations in said finishing tube, into said juice receiving chamber.

11. A combination as in claim 10 in which said plunger is provided with a restricted hole extending longitudinally through said plunger, said pulp being forced through said hole as a result of its being compressed between said plunger and the other of said cups by the reciprocation of said plunger in said finishing tube.

12. A combination as in claim 11 in which said hole is tapered and said means for reciprocating said plunger in said finishing tube withdraws said plunger a substantial distance within said tube from said cutter at the conclusion of a fruit compressing cycle while said cups are being separated to receive a whole fruit for a subsequent cycle, said plunger reciprocating means then delaying the pulp compressing movement of said plunger until a substantial portion of the pulp and juice of the piece of fruit thus received between said cups has been expressed therefrom in said subsequent cycle and discharged through said cutter and into the vacant space in said finishing tube between said cutter and said plunger.

13. A combination as in claim 12 in which said plunger terminates in a sharp edge which surrounds the restricted hole therein and in which the interdigitation of said cups proceeds to a point where a portion of the rind originally disposed diametrically opposite the portion in which said hole was formed by said cutter, is impaled upon said cutter to cut a button therefrom, and in which said plunger reciprocating means extends said plunger to a point where said button is forced by the other of said cups into the opening in said plunger, whereby, when said plunger is subsequently retracted through said finishing tube as aforesaid towards the end of the fruit compressing cycle, said button is carried with said plunger.

14. In a device for extracting juice from whole citrus fruit, the combination of: a pair of opposed cups having hemispheroidal bowl cavities, the side walls of each cup comprising a multiplicity of elongated narrow teeth separated by correspondingly narrow slots, the teeth of each cup being aligned with the slots of the other cup for interdigitation and the bowl cavities of said cup being shaped to conformably contact substantially the entire outer surface of the whole fruit upon initial interdigitation of said teeth, a tubular cutter being provided on one of said cups and extending thereinto to form a hole in the rind of said fruit when the latter is compressed between said cups, whereby subsequent progressive interdigitation of said teeth expresses the juice from the fruit through a juice passage defined by said cutter without the fruit bursting between said teeth, a tube having substantially the same inside diameter as said cutter and connected coaxially therewith, a plunger reciprocably mounted in said tube, said plunger being tubular and having a thin upper edge, the interdigitation of said cups extending to a point where a portion of the rind of said fruit originally disposed diametrically opposite the portion from which said hole was cut is impaled on said cutter to cut a button from said rind; and means for reciprocating said plunger in said tube in timed relation with the relative movement between said cups whereby said plunger is moved in said tube towards said cutter during the final portion of a fruit compressing operation to force through said tubular plunger pulp previously expelled from said fruit through said cutter and into said tube, said plunger continuing said movement into proximity with said other cup whereby the latter forces said button into the upper end of said plunger, causing said button to be carried with said plunger as the latter is retracted by said reciprocating means to its starting position at the close of a fruit compressing cycle.

15. A combination as in claim 14 in which said other cup is provided with spurs which extend into the bowl thereof whereby said spurs penetrate the rind of a fruit at the start of a fruit compressing cycle, said spurs surrounding the portion of said rind from which said button is cut to prevent the buckling of said portion by the constriction of said fruit by said cups whereby the button cut from said portion and delivered into said tubular plunger will remain in said plunger when the latter is retracted as aforesaid.

16. A method of extracting juice from a fresh, whole substantially spherical citrus fruit which comprises the steps of confining said fruit in a space closely conforming thereto, cutting a button from the rind of said fruit concentric with a given compression axis extending through the center of said fruit to form a hole in said rind concentric with said axis, decreasing the space within which said fruit is confined by the application of compressive forces to opposite substantially spherical portions thereof, developing a diffused pattern of relatively narrow spaces, outside the space defined by the axial projection of the area of said hole, against which said compressive forces are not applied, said narrow spaces being of insufficient width to permit the outward bursting of said rind through said spaces during the juice expelling constriction of said fruit resulting from said compression whereby the juice and pulp within said fruit are expelled through said hole by said compression, and continuing said compression to the point where those portions of the rind disposed outside the axial projection of the area of said hole are extruded through said narrow spaces.

17. A method as defined in claim 16 which includes the step of cutting a second button, which is of substantially the same size as and concentric with the aforesaid button, from a portion of the rind originally disposed diametrically opposite that portion from which said first button was cut, and forcing said second button through the area of the hole formed by cutting said first button as the compression of said fruit is concluded with the results aforesaid.

JAMES M. HAIT.

References Cited in the file of this patent

UNITED STATES PATENTS

| Number | Name | Date |
|---|---|---|
| 599,856 | Middlekauff | Mar. 1, 1898 |
| 1,840,182 | Bailey | Jan. 5, 1932 |
| 1,925,196 | Maull | Sept. 5, 1933 |
| 1,938,463 | Roberts | Dec. 5, 1933 |
| 1,960,501 | Maull | May 29, 1934 |
| 2,345,731 | Coyle | Apr. 4, 1944 |
| 2,346,561 | Delay | Apr. 11, 1944 |
| 2,420,679 | Pipkin | May 20, 1947 |
| 2,420,681 | Peterson | May 20, 1947 |
| 2,475,559 | Wilson | July 5, 1949 |
| 2,534,554 | Kahre | Dec. 19, 1950 |